United States Patent Office 2,987,552
Patented June 6, 1961

2,987,552
PREPARATION OF LIQUID ALKYLATED DECABORANES
Joseph A. Neff, Niagara Falls, and Edward J. Wandel, Buffalo, N.Y., assignors, by mesne assignments, to Olin Mathieson Chemical Corporation, a corporation of Virginia.
No Drawing. Filed Jan. 6, 1956, Ser. No. 557,634
2 Claims. (Cl. 260—606.5)

Our invention relates to a method for the preparation of liquid alkylated decaboranes, including ethylated decaboranes such as monoethyldecaborane and diethyldecaborane.

The preparation and manner of using liquid alkylated decaboranes, including ethyldecaboranes, as fuels is described in Altwicker, Garrett, Weilmuenster and Harris application Serial No. 497,407, filed March 28, 1955.

In accordance with our present invention, we have discovered a new method whereby liquid alkylated decaboranes, such as monoethyldecaborane and diethyldecaborane, can be manufactured. Thus, we have found that monoethyldecaborane and diethyldecaborane can be prepared by passing ethylene into a mixture of decaborane and aluminum bromide or aluminum chloride or a mixture thereof. The mixture can consist of a slurry of aluminum halide in molten decaborane or it can consist of solid decaborane intimately admixed with solid aluminum halide depending upon the reaction temperature employed. When carrying out the reaction the temperature of the decaborane can vary from 0° C. to about 200° C. At higher temperatures, the aluminum halide catalyst appears to react with the decaborane resulting in an undesirable reduction in the yield of the desired product. The amount of aluminum halide employed will generally vary from about 0.02 mole to 1.00 mole per one mole of decaborane. The amount of ethylene or other lower monoolefin hydrocarbon such as propylene, 1-butene, 2-butene, isobutylene or mixtures thereof, used can be varied quite widely, generally being from about 0.5 to 4.0 moles to one mole of decaborane depending on the method of operation and the particular type of product desired.

The following examples, conducted at substantially atmospheric pressure, illustrate in detail various embodiments which fall within the scope of our invention. In the examples, the term "moles" means gram moles unless otherwise specified.

*Example I*

Ethyldecaboranes were prepared by passing ethylene into molten decaborane in the presence of aluminum chloride. In the experiment conducted, a mixture of 100 g. of crystalline decaborane and 10 g. of aluminum chloride was placed in a 500 cc. gas-washing bottle. The bottle contained a sintered glass sparger disc near the bottom and a side-arm tube which permitted the entrance of gas through the sparger disc. Ethylene from a cylinder was passed first through a Fisher-Porter flowmeter, then through a wet-test meter followed by a drying train and then into the gas-washing bottle. From the gas-washing bottle the off-gases were passed through a wet-test gas meter and then exhausted to the atmosphere. The gas-washing bottle was immersed in an oil bath which was heated to approximately 132° C. at the beginning of the reaction and maintained at a temperature of between 132° C. and 60° C. during the reaction time. The reaction temperature was maintained above the melting point of decaboran (100° C.) during most of the reaction time. During the 17 hour reaction period, which was interrupted several times for a total period of about 96 hours during which time the reaction was stopped and the contents of the reactor allowed to cool to room temperature, more than 100 liters of ethylene (measured at 750 mm. of Hg and 22° C.) were bubbled through the molten mixture and approximately 28 liters (measured at 750 mm. of Hg and 22° C.) were absorbed by the reactants.

After two hours reaction time a small sample of the reaction mixture was removed and by infrared analysis it was shown that the alkylated decaborane material produced was principally monoethyldecaborane. At the end of the 17 hour reaction period the gas feed was stopped and after the reaction mixture had cooled approximately 50 cc. of water was added to the reaction mixture in order to hydrolyze the catalyst. The reaction mixture, with the added water, was allowed to stand overnight. In the next step most of the water was removed by decantation and a vacuum distillation was carried out on the viscous material remaining. Most of the unreacted decaborane was removed by heating the pot and allowing the decaborane to sublime into three air-cooled bulbs which were attached in series above the distillation pot. The remainder of the liquid was then further distilled in an apparatus equipped with a large overhead condenser to trap solid decaborane above the refluxing liquid material. This preliminary distillation produced two samples: Cut No. 1 (0.9 g.) and Cut No. 2 (11.0 g.) along with 22.0 g. of residue. Cuts No. 1 and 2 were combined and redistilled between 0.25 mm. of Hg and 45° C. at the beginning to 0.38 mm. of Hg and 68° C. at the end. During this second distillation operation two samples were collected. The first, weighing 7.2 g., was principally monoethyldecaborane as determined by infrared analysis, and the second, weighing 1.0 g., was by infrared analysis shown to be principally monoethyldecaborane with small quantities of diethyldecaborane included. The residue of 2.4 g. was shown by infrared analysis to contain principally diethyldecaborane with traces of monoethyldecaborane.

*Example II*

In this experiment 12.2 g. of decaborane and 2.8 g. of aluminum bromide were charged to a 1" diameter by 8" length Pyrex pipe reactor which was sealed at one end and fitted at the top with a gas inlet and outlet tube. Ethylene was fed into the reactor and within ten minutes the skin temperature of the reactor had risen to a maximum of 88° C. During the 48 minute reaction period the temperature rose quickly to a maximum of 88° C. and then dropped back gradually to 46° C. at the end of the reaction period. The reaction mixture was removed and quenched with 150 ml. of water at 25° C. in order to hydrolyze the aluminum bromide. About 50 ml. of water was used to rinse out the reactor and this wash was added to the beaker containing the previously removed reaction mixture. Then about 200 ml. of n-pentane was added to the beaker to dissolve the unreacted decaborane and the decaborane derivatives of the reaction product. With the addition of the n-pentane two layers were formed, the top layer, or n-pentane layer, containing the unreacted decaborane and decaborane derivatives and the bottom, or water layer, containing the added water and the hydrolyzed aluminum bromide. The pentane layer was decanted off and the water layer discarded. The pentane layer was then cooled to −78° C. in order to remove part of the unreacted decaborane by crystallization. After separation of the crystallized decaborane by filtration, a part of the n-pentane was removed from the remaining liquid by applying a vacuum down to 1–2 mm. of Hg. The remaining liquid was vacuum distilled. In the first stages of distillation the remaining n-pentane was stripped off along with a small amount of decaborane and in the final stages of the distillation two liquid fractions were collected. The first liquid fraction, which weighed 9.5 g., was distilled at 0.20 mm. of Hg between 30° and 63° C. Infrared analysis indicated that this sample contained approximately 70 percent monoethyldecaborane. By chemical analysis this sample was shown to contain 55 percent boron, 31 percent carbon and 11 percent hydrogen.

*Example III*

In this experiment 24.4 g. of decaborane and 5.6 g. of aluminum bromide were placed in a 250 cc. Magne Dash autoclave reactor equipped with a stirrer. Ethylene was fed continuously into the reactor over a reaction period of 1.83 hours. The reaction vessel was heated by a bath the temperature of which dropped from 39° C. to 31° C. during the 1.83 hour run. The contents of the reactor were transferred to a 250 ml. flask and about 70 ml. of methylene chloride was added. To this mixture there was added 25 ml. of water at room temperature in order to hydrolyze the aluminum bromide. With the addition of water two phases were formed, the bottom, or methylene chloride layer, containing the methylene chloride together with the unreacted decaborane and reaction products and the top, or water layer, containing the added water and hydrolyzed aluminum bromide. The methylene chloride layer was removed and then cooled to −78° C. to separate unreacted decaborane by crystallization. During this operation 15.0 g. of crystalline decaborane were obtained which was removed by filtration. A second cooling operation, carried out in the same manner as the first, produced 1.8 g. of decaborane. In the next step the methylene chloride solvent was stripped off at reduced pressure. The reaction mixture was then subjected to a vacuum distillation and in the first stage of this distillation operation 4.7 g. of decaborane were sublimed from the reaction mixture. A liquid sample was collected during the distillation operation which weighed 1.4 g. and boiled between 72° C. at 2.0 mm. of Hg and 98° C. at 1.6 mm. of Hg. There remained, after distillation, a liquid residue weighing 3.9 g. Both infrared and mass spectrographic analysis were conducted on the liquid distilled sample. Mass spectrographic analysis indicated that the sample contained approximately 70 percent monoethyldecaborane, approximately 25 percent decaborane and some diethyldecaborane. The decaborate recovery totalled 21.9 g. which indicated that based on decaborane used the yield of monoethyldecaborane was 30 percent.

*Example IV*

In this experiment 24.4 g. of crystalline decaborane and 2.8 of aluminum bromide were mixed and placed in a reactor constructed of 2 inch glass pipe which was 2 inches in diameter and 8 inches in length. The reactor was capped with a stainless steel plate fitted with two ¼ inch stainless steel tubing openings which, in turn, were soldered in place with silver solder. One opening, which was utilized as the gas inlet, was attached to a sintered glass gas disperser which allowed the ethylene to enter the reactor near the bottom. Ethylene was passed into the reactor through a flowmeter. The reactor was heated by a bath and during the reaction the temperature ranged from 22° C. at the beginning to a maximum temperature of 64° C. A magnetic stirring bar provided agitation when enough liquid had formed to allow the stirrer to move. The total reaction time was 4.3 hours with a shut down time of 2 hours during the experiment. At the conclusion of the reaction, the reaction mixture was washed into a round-bottom flask with about 50 ml. of methylene chloride, stored in a Dry-Ice bath overnight and then filtered to remove the decaborane which had crystallized out. The crystalline decaborane, after being washed with 30 ml. of cold methylene chloride, was placed under a vacuum for about 15 minutes in order to dry the decaborane. Crystalline decaborane in the amount of 14.9 g. was recovered. To the methylene chloride solution consisting of the filtrate from the decaborane recovery operation as well as the methylene chloride used to wash the crystalline decaborane there was added 25 ml. of water at 20° C. in order to hydrolyze the aluminum bromide. With the addition of water to the methylene chloride solution containing the reaction mixture, two phases were formed, the bottom, or methylene chloride layer, containing the reaction products and any remaining unreacted decaborane and the top, or water layer, containing hydrolyzed aluminum bromide. By evaporation at reduced pressure most of the methylene chloride was stripped off. The remaining liquid, with some methylene chloride, was then vacuum distilled. In the first stage of the distillation operation, the last traces of methylene chloride were removed and then the decaborane was removed by subliming it from the distillation flask into a take-off condenser equipped with a large surface area in which the decaborane was trapped. This particular unit for decaborane removal prevented the sublimed decaborane from mixing with the ethyldecaboranes which later distilled at a higher temperature. After the decaborane, in the amount of 3.0 g., had been removed, a liquid sample in the amount of 3.0 g. was removed over the vapor temperature range of 67° C. at 0.75 mm. of Hg to 74° C. at 0.80 mm. of Hg. An insignificant amount of residue remained in the pot after the completion of distillation. The total crystalline decaborane recovery was 17.9 g. The liquid sample was analyzed by mass spectrograph and was shown to contain 29 percent decaborane, 63 percent monoethyldecaborane and approximately 8 percent diethyldecaborane.

*Example V*

The procedure and equipment utilized in this experiment were similar to that of Example IV. Crystalline decaborane in the amount of 24.4 g. and 5.6 g. of aluminum bromide, together with several small porcelain balls were introduced into the reactor. The balls were added to the reactor in order to aid the magnetic stirrer in mixing the decaborane and catalyst. Ethylene was introduced over a period of 1.4 hours. The reactants were removed from the reactor in 70 ml. of methylene chloride and then treated with 30 ml. of water in order to hydrolyze the aluminum bromide. With the addition of water to the reaction mixture, two phases were formed, the bottom layer, or methylene chloride layer, containing the unreacted decaborane together with the decaborane derivatives, and the water layer, or top layer, containing the water with the hydrolyzed aluminum bromide. The methylene chloride solution was stored overnight under a Dry-Ice bath in order to crystallize out the unreacted decaborane. The decaborane was removed by filtration and the crystals washed with 20 ml. of methylene chloride. Methylene chloride was removed from the wet crystals by stripping under vacuum and 6.7 g. of dry decaborane was obtained. The methylene chloride solution consisting of the filtrate and wash from the decaborane recovery steps was then subjected to a vacuum distillation as in the previous examples. In the first stage of this distillation operation the remaining traces of methylene chloride were removed and unreacted crystalline decaborane was sublimed from the distillation pot. During the removal of decaborane a total of 7.9 g. of crystalline decaborane were recovered and in the subsequent distillation a liquid sample of 8.2 g., boiling between 67° C. at 1.0 mm. of Hg to 120° C. at 1.5 mm. of Hg was recovered. By infrared analysis the liquid sample was shown to contain 38 percent decaborane, 52 percent monoethyldecaborance and approximately 10 percent diethyldecaborane.

We claim:
1. A method for the preparation of liquid alkylated decaboranes which comprises passing a mixture consisting of at least one lower monoolefin hydrocarbon into a mixture of decaborane and an aluminum halide selected from the group consisting of aluminum bromide and aluminum chloride maintained at a temperature of from about 0° C. to about 200° C., the reaction being conducted using from 0.02 to 1 mole of said aluminum halide per mole of decaborane and from 0.5 to 4.0 moles of said monoolefin hydrocarbon per mole of decaborane.

2. The method of claim 1 wherein said monoolefin hydrocarbon is ethylene.

No references cited.